(12) United States Patent
Ramesh et al.

(10) Patent No.: US 8,904,555 B2
(45) Date of Patent: Dec. 2, 2014

(54) COMPUTER IMPLEMENTED SYSTEM FOR FACILITATING CONFIGURATION, DATA TRACKING AND REPORTING FOR DATA CENTRIC APPLICATIONS

(75) Inventors: Rajini Ramesh, Tamil Nadu (IN); Vishnupriya Janardhanan, Tamil Nadu (IN); Madhavi Garlapati, Tamil Nadu (IN); Dhinakaran P, Tamil Nadu (IN)

(73) Assignee: Tata Consultancy Services Ltd. (IN)

( * ) Notice: Subject to any disclaimer, the term of this patent is extended or adjusted under 35 U.S.C. 154(b) by 221 days.

(21) Appl. No.: 13/410,047

(22) Filed: Mar. 1, 2012

(65) Prior Publication Data

US 2012/0304307 A1    Nov. 29, 2012

(30) Foreign Application Priority Data

Mar. 1, 2011   (IN) .......................... 565/MUM/2011

(51) Int. Cl.
  *H04L 29/06*    (2006.01)
  *G06Q 10/06*    (2012.01)
(52) U.S. Cl.
  CPC ...................................... *G06Q 10/06* (2013.01)
  USPC ...................................................... 726/28
(58) Field of Classification Search
  CPC .................. G06F 17/30058; G06F 17/30194; G06F 9/5061
  USPC ......................................................... 726/28
  See application file for complete search history.

(56) References Cited

U.S. PATENT DOCUMENTS

| 5,604,892 | A | 2/1997 | Nuttall et al. |
| 7,272,815 | B1 | 9/2007 | Eldridge |
| 7,698,284 | B2 | 4/2010 | Becker et al. |
| 7,831,584 | B2 | 11/2010 | Rothman |
| 2001/0018642 | A1 | 8/2001 | Balaban et al. |
| 2002/0147732 | A1 | 10/2002 | Lee et al. |
| 2005/0102154 | A1 | 5/2005 | Dodd et al. |
| 2007/0038596 | A1 | 2/2007 | Pizzo et al. |
| 2007/0118877 | A1* | 5/2007 | Karabulut .......................... 726/3 |
| 2007/0289002 | A1* | 12/2007 | van der Horst et al. ............ 726/9 |
| 2008/0010243 | A1 | 1/2008 | Weissman et al. |
| 2008/0313536 | A1 | 12/2008 | Larsen |
| 2010/0250608 | A1* | 9/2010 | Malviya et al. ................ 707/792 |

FOREIGN PATENT DOCUMENTS

WO    2010114612 A1    10/2010

* cited by examiner

*Primary Examiner* — Jason Gee

(57) ABSTRACT

A computer implemented system for facilitating configuration, data tracking and reporting for data centric applications and a method for performing the same have been disclosed. The system enables an enterprise to quickly move from paper based tracking to web based mode by configuring metadata. Also, the system hosts multiple tenants on a single server and enables creation of workspace to enable users within a tenant to securely view the data based on his/her permission levels. Additionally, the system classifies the resources as 'Human' and 'Non-Human' resources and further as static resources which are shared metadata across tenants and non-static resources which are applicable only to a particular tenant. Thus, the system enables common information to be shared easily across various organizations while securing the data via workspaces. Furthermore, the system includes report creation and dashboard generation capability using data from within the system as well as from external databases.

16 Claims, 4 Drawing Sheets

COMPUTER IMPLEMENTED SYSTEM FOR FACILITATING CONFIGURATION, DATA TRACKING AND REPORTING FOR DATA CENTRIC APPLICATIONS

CROSS-REFERENCE TO RELATED APPLICATIONS

This application claims priority from Indian Application No. 565/MUM/2011, filed on Mar. 1, 2011, entitled, "A Computer Implemented System for Facilitating Configuration, Data Tracking and Reporting for Data Centric Applications."

FIELD OF THE DISCLOSURE

The present disclosure relates to multitenant systems for data configuration tracking and reporting.

DEFINITIONS

The term 'multitenant' in this specification relates to providing personalized interfaces to discrete customers and hosting their data and application interfaces on one server.

The term 'resource' in this specification relates to entities for which data is to be captured for performing certain operations.

The term 'faceted search' in this specification relates to a provision given to users to refine current search results by getting finer details on the content being searched.

The term 'portal role' in this specification defines access permissions a user has to access information recorded in the system. All permissible actions of a user are authorized by the portal role.

BACKGROUND

Information technology has enabled businesses both small and large to switch from paper based manually tracking systems to automated processes for tracking data and their day to day operations with ease and accuracy.

An efficient way of tracking of processes and data in the prior art was via spreadsheets. Spreadsheets enabled users to organize data and insert code and functions for automatically performing various operations on data for tracking and reporting purposes.

However, tracking and reporting of data using spreadsheets is unmanageable for large quantities of data. Also, sharing of a large volume of data using spreadsheets gets difficult as setting appropriate permissions for restricting various amendments to the data, adding filters suitable for a particular user are not possible. Moreover, the spreadsheets do not give the provision to add triggers for performing certain action on sensing data changes. Hence, manual dependency is still required for tracking data and operations.

Another way of tracking of processes, data and creating custom reports is via custom built software applications. These customized applications not only enable businesses to streamline their operations but also enable efficient tracking of day to day activities. However, building of a software application customized for a particular business involves investing a lot of money and time alike. Time is invested to explain the business requirements, processes required for day to day running of the business, user interface requirements and reports required by the business. The software, as it has to be custom built from scratch, requires time for development, and then it had to go through the software development lifecycle of testing and user acceptance. Many a times, as the user requirements are not effectively incorporated or did not meet the customer's expectation, re-development is required. Hence, this increases the delay in the hosting of the software application at business site.

Therefore, there is felt a need for a system which overcomes the above drawbacks and in which:

a large volume of data can be tracked, shared and viewed securely;

triggers can be added to handle data changes automatically;

application interfaces for a business can be created efficiently in less time and cost; and processes and reports can be created with minimum efforts and human intervention.

OBJECTS

Some of the objects of the present disclosure, which at least one embodiment herein satisfies, are as follows:

It is an object of the present disclosure to provide a system in which a large volume of data can be tracked, shared and viewed securely.

It is another object of the present disclosure to provide a cost and time effective system.

It is yet another object of the present disclosure to provide a system which requires minimum human intervention.

It is still another object of the present disclosure to provide a system in which customized application interfaces can be created with minimum efforts and expertise.

SUMMARY

The present disclosure envisages a computer implemented system for facilitating configuration, data tracking and reporting for data centric applications. The system, in accordance with the present disclosure includes:

a metadata driven database server comprising application data repository and system data repository, wherein the system data repository is adapted to host metadata, the application data repository is adapted to host application data for a plurality of tenants, the application data is divided into resources and the resources are further divided into attributes;

a data security unit co-operating with the database server adapted to provide object level, attribute level and record level security for the application data;

a plurality of units co-operating with the data security unit to access the database server and adapted to provide data configuration, tracking and reporting functionalities; and a web based browser co-operating with the database server, the data security unit and the plurality of units adapted to authenticate users and derive their portal role information and further adapted to display personalized workspace for authenticated users and still further adapted to provide authenticated users secure access to the plurality of units based on the portal role.

Typically, in accordance with the present disclosure, the resources are selected from the group of resources consisting of human resources, non-human resources, static resources and non-static resources.

Typically, in accordance with the present disclosure, the attributes are selected from the group of attributes consisting of derived attributes, direct value attributes.

Typically, in accordance with the present disclosure, the database server further includes:

importing means adapted to import external application data from multiple data sources including spread sheets and flat files;

data partitioning means adapted to securely partition data of different tenants based on their tenant identification number and group identification number; and first triggering means adapted to trigger a formula recalculation action in the event that value of a formula based attribute changes.

Typically, in accordance with the present disclosure, the data security unit is further adapted to receive portal role information for a user from the browser, the data security unit further includes:

object level checking means adapted to check if a user is authorized to get access to a particular resource based on predefined resource permissions and the portal role information;

record level checking means adapted to restrict display of application data based on predetermined workspace associated with a user and predefined rules for a resource for the portal role; and attribute level checking means adapted to restrict display of an attribute value for a user based on the portal role.

Typically, in accordance with the present disclosure, the system includes registration means adapted to register an enterprise and its member companies with the system and further adapted to assign unique tenant identification number and group identification number to each of the enterprises and its member companies in the event that the registration is successful.

The present invention envisages a computer implemented system for facilitating configuration, data tracking and reporting for data centric applications, the system comprising:

a metadata driven database server comprising application data repository and system data repository, wherein the system data repository is adapted to host metadata, the application data repository is adapted to host application data for a plurality of tenants, the application data is divided into resources and the resources are further divided into attributes;

a data security unit co-operating with the database server adapted to provide object level, attribute level and record level security for the application data;

a plurality of units co-operating with the data security unit to access the database server and adapted to provide data configuration, tracking and reporting functionalities, wherein at least some of the plurality of units include a search engine, a workflow unit, a reporting unit and a configuration unit; and a web based browser co-operating with the database server, the data security unit and the plurality of units adapted to authenticate users and derive their portal role information and further adapted to display personalized workspace for authenticated users and still further adapted to provide authenticated users secure access to the plurality of units based on the portal role.

Typically, in accordance with the present disclosure, the configuration unit is adapted to create at least one personalized workspace for a user based on user's portal role information in an enterprise, the configuration unit further adapted to enable configuration of personalized forms with validation rules for manual entry of data and graphical interfaces based on the metadata.

Typically, in accordance with the present disclosure:

the search engine is adapted to dynamically create indexes for the resources and further adapted to provide faceted search results for the resources;

the reporting unit co-operates with the database server having means for creation of customized drill down able reports and dashboards using data from the database server and external data sources;

the workflow unit co-operates with the database server having a rules repository to store time-based workflow rules and corresponding actions for each of the resources, the workflow unit adapted to add actions for a particular resource and trigger the actions at a predetermined time based on the workflow rules.

Typically, in accordance with the present disclosure, the workflow unit further includes:

action creation means adapted to enable a user to add a particular time-based action to a resource based on the workflow rules;

second triggering means adapted to trigger an action at a predetermined time; and an action detail repository adapted to record the actions triggered by the second triggering means.

Typically, in accordance with the present disclosure, the workflow unit is adapted to add actions selected from the group of actions consisting of email reminders, task reminders and attribute/resource updates to a particular resource.

Typically, in accordance with the present disclosure, the search engine further includes:

index management means adapted to dynamically create indexes on creation of resources and further adapted to re-index and/or delete the index in the event that the resource is updated or deleted;

searching means adapted to accept a search criteria from a user and further adapted to retrieve data corresponding to the search criteria from the database server; and search display means co-operating with the data security unit, the search display means adapted to display retrieved data on the browser based on the portal role information of the user.

The present disclosure envisages a method for providing multitenant data configuration, tracking and reporting, the method, in accordance with the present disclosure includes the following steps:

creating a metadata driven database for hosting system data and application data for a plurality of tenants, wherein the application data of discrete tenants is partitioned based on a unique identification number assigned to the tenants and the application data is divided into resources and resources are further divided into attributes;

providing object level, attribute level and record level restrictions for security of the application data;

providing a plurality of units for securely accessing the database for providing data configuration, tracking and reporting functionalities;

authenticating a user logged in via a remote web based interface;

determining the user's portal role and tenant; and displaying a personalized workspace for the user and providing the user access to the plurality of units.

Typically, in accordance with the present disclosure, the step of providing object level security includes the steps of:

determining permissions assigned to resources; and checking if a user is authorized to get access to a particular resource based on the resource permissions and the portal role of the user.

Typically, in accordance with the present disclosure, the step of providing record level security includes the following steps:

determining the workspace and corresponding tenant of a user;

determining rules if any defined for a particular resource; and verifying if the data can be displayed for a particular user based on predetermined workspace and the predefined rules for a resource for the portal role of the user.

Typically, in accordance with the present disclosure, the step of providing attribute level security includes the steps of verifying if an attribute is restricted from being displayed for a particular portal role and denying access to that attribute data.

Typically, in accordance with the present disclosure, the step of providing a plurality of units includes the steps of providing a search engine for dynamically creating indexes for resources and providing faceted search results for the resources.

Typically, in accordance with the present disclosure, the step of providing a plurality of units includes the steps of providing a workflow unit for adding time-based actions for a particular resource, triggering the action at the predetermined time, recording the actions in a repository.

Typically, in accordance with the present disclosure, the step of providing a plurality of units includes the steps of providing a reporting unit for creating custom reports, charts and dashboards for a user for selected resources including the steps of:

creating a query to retrieve all the instances and attributes of selected resources;

creating a procedure to run the query and update a snapshot table;

running a flat query on the snapshot table at run time;

running filters on the snapshot table based on the portal role information of the user; and displaying the data to the user as custom reports and/or charts.

BRIEF DESCRIPTION OF THE ACCOMPANYING DRAWINGS

The present invention will now be described with reference to the accompanying drawings in which.

DETAILED DESCRIPTION OF THE ACCOMPANYING DRAWINGS

Figure 1:
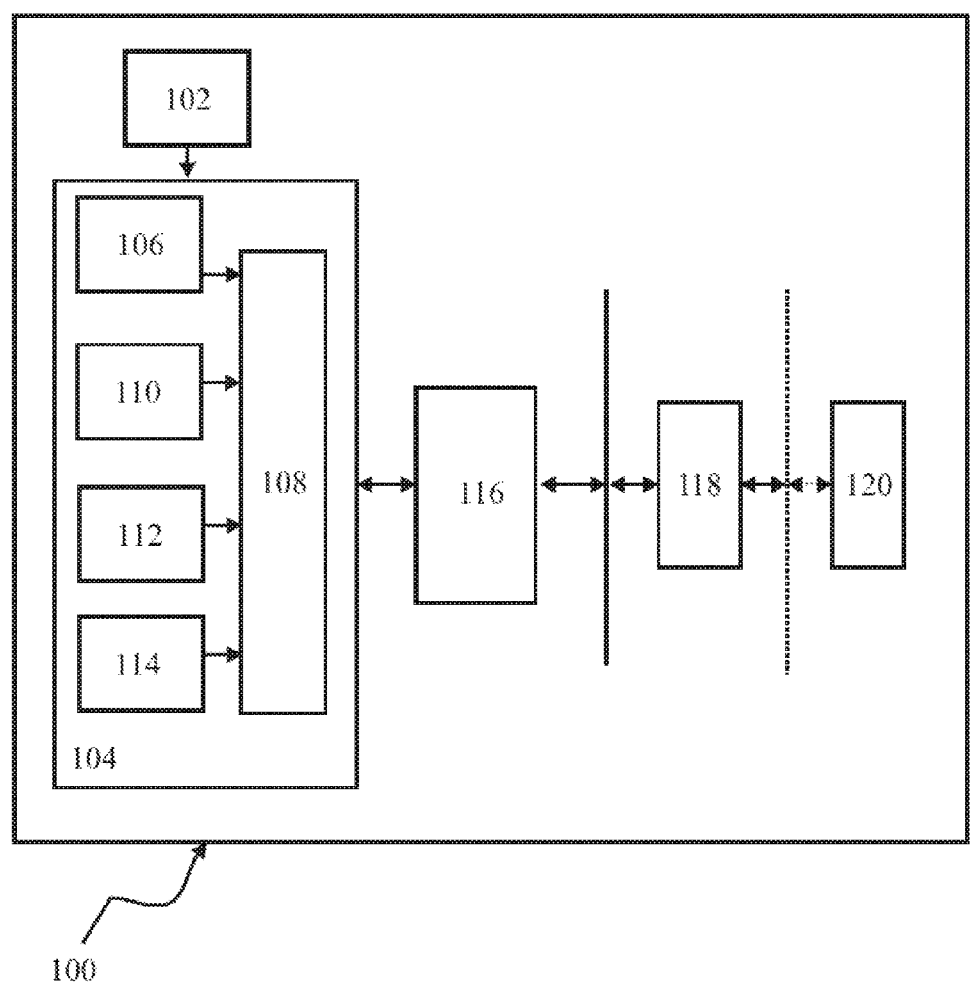
FIG. 1 illustrates a schematic of a computer implemented system for facilitating configuration, data tracking and reporting for data centric applications in accordance with the present disclosure.

The present disclosure will now be described with reference to the accompanying drawings which do not limit the scope and ambit of the disclosure. The description provided is purely by way of example and illustration.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The description herein after, of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Spreadsheets and paper based tracking systems of the prior art were not efficient in terms of handling large quantities of data. Also, the security of data in these systems was compromised as amendments and deletion of data cannot be restricted based on the access level details of a particular user. Moreover, creation of a graphical user interface and information auditing was not possible with these systems. Hence, in view of overcoming these shortcomings the present disclosure envisaged a computer implemented system for facilitating configuration, data tracking and reporting for data centric applications of enterprises.

The proposed system provides a multitenant architecture wherein enterprises data is stored on a single schema in one database. Each enterprise or tenant is identified by a unique tenant identification number and enterprises which have member companies or organizations within a tenant are identified by a group identification number. The system enables enterprises to access their data using remote web based personalized interfaces. The system efficiently partitions the data for the different enterprises and provides users personalized workspaces to access the data based on their role and hierarchy in the enterprise. If a user is associated with an enterprise and also its member company then the user will be mapped to two workspaces based on the role of the user in the enterprise and the member company.

Data partitioning is performed by the present disclosure based on tenant identification number and then by group identification number within a tenant.

In accordance with one aspect of the present disclosure, the system provides security at different levels in the system. The security is provided at the record level, object level and attribute level, thus ensuring that only a valid user is able to access, view or update the data.

In accordance with another aspect of the present disclosure, the system consists of a database server which holds metadata and application data. The metadata enables management of database design including new table definition, resource definitions, security polices, trigger definitions and relationships between the tables for an enterprise. The application data is further divided into human and non-human resources. This segregation helps in auto creation and management of indexes for human type of resources for increasing the speed of search. Still further, the resources are divided into static and non-static resources. The static resources are shared across tenants and the non-static resources are created for a particular tenant only.

In accordance with still another aspect of the present disclosure, the system includes a search engine which queries on the indexed data and restricts access to view complete information based on the access level of the valid user. The search results provided by the search engine can be drilled down on any of the attributes that are chosen at the time of configuration aka faceting.

The proposed system also enables actions to be taken conditionally based on certain criteria that users define on a resource. The criteria get recorded as workflow rules and can be triggered when the data is added by the user. In accordance with this disclosure the action can be of type email, task or attribute updates.

Additionally, the system gives the provision of having attributes to a resource of type formula. Functions that are available in formula attribute definition include Math, Text, Date and Time, Conditional and the like. Thus, whenever an attribute value that comprises a formula, changes the value of the formula is dynamically recalculated.

Thus, the present disclosure provides a generic architecture which enables easy porting of a spreadsheet based/paper based prior art system into the system envisaged by the present disclosure. The proposed system not only minimizes the operational cost but also enables faster and secure deployment of enterprises data and operations.

Referring to the accompanying drawings, FIG. 1 illustrates a schematic of a computer implemented system for facilitating configuration, data tracking and reporting for data centric applications in accordance with the present disclosure. The system 100 comprises registration means 102 to register details of enterprises and its member companies with the system 100. On successful registration, registration means 102 assigns unique tenant identification number and a group identification number to each of the enterprises and its member companies.

In addition, the system 100 includes the following components:
- a metadata driven database server 104 which hosts metadata and application data for a plurality of tenants;
- a data security unit 116 co-operating with the database server 104 to provide object level, attribute level and record level security for the application data;
- a plurality of units represented by reference numeral 118 co-operating with the data security unit 116 to access the data in the database server 104 to provide data configuration, tracking and reporting functionalities; and
- a web based browser 120 co-operating with the database server 104, the data security unit 116 and the plurality of units 118. The browser 120 includes means to authenticate users and derive their 'portal role information' and further display personalized workspace for authenticated users. The browser 120 also provides authenticated users access to the plurality of units 118 based on their 'portal role information'.

The components of the system 100 will be explained in detail hereinafter.
Database Server:

The database server 104 is a metadata driven database unit which comprises a system data repository 106 and an application data repository 108. The system data repository 106 stores metadata which defines data structure of a tenant including table definitions, the attribute types, the dependency relationships between the tables, the report generation details and the like for creation or movement of data in the database server 104. The application data repository 108 hosts application data for a plurality of tenants, wherein each tenant represents an enterprise. Subsequently, the tenants can include a plurality of member companies which are represented in the form of groups in accordance with this disclosure. Also, the application data is divided into resources and the resources are further divided into attributes.

Figure 2:
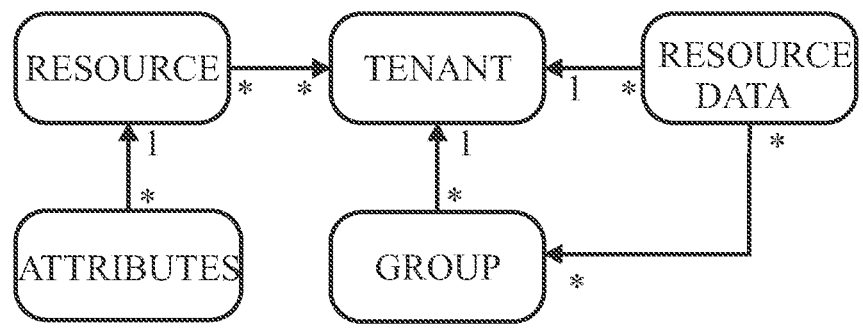
FIG. 2 illustrates a relationship diagram showing the metadata architecture in accordance with the present disclosure.

FIG. 2 of the accompanying drawings shows the dependency relationships between the tenants, their resources and the resource/application data. Also, the dependency relationship between attributes and resources; and tenants and group can be seen. As seen in FIG. 2, as per the metadata stored in the system data repository 106, every tenant can have multiple groups and resource data as represented by (1 and *) notation. Further, a plurality of resources can be associated or shared amongst tenants represented by (* and *) notation and each resource can have multiple attributes represented by (1 and *) notation. Based on the aforementioned dependency relationships data is created and shared amongst the tenants.

Figure 3:
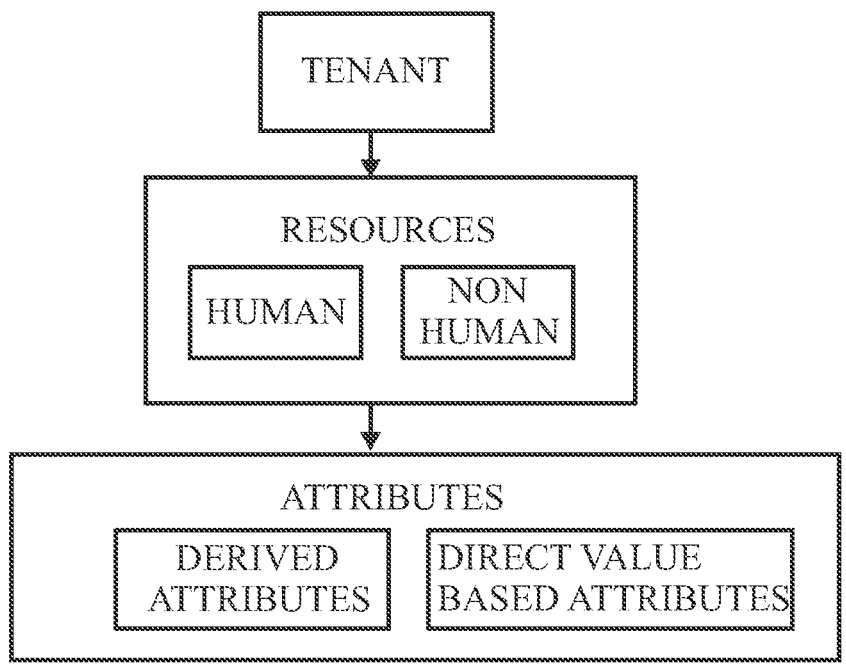
FIG. 3 is a block diagram showing the type of resources and attributes provided by the proposed system in accordance with the present disclosure.

The application data repository 108 holds the enterprises day to day operational application data. In accordance with the present disclosure the resources are further divided into various resource types including human resources, non-human resources, static resources and non-static resources. Also, the attributes are divided into derived attributes, direct value based attributes, formula based attributes and category based attributes shown in FIG. 3.

In accordance with this disclosure when a resource is marked as a static resource, then this resource is mandatory and is shared across all tenants. For instance, a static user table definition in the system data repository 106 is shared by all tenants hosted on the database server 104. Non-static resources are resources which are specific to a particular tenant and hence not available across all tenants.

In accordance with this disclosure, the human type of resources are the users of this system for a particular tenant and/or group. Resources other than users of the system are the non-human resources for instance, a bank or a car or the like non-living entities for which data is to be captured. The advantage of creation of human resource type is to allow creation of various user groups with varying attributes in a single user table; thus eliminating the need of maintaining different database tables for storing information on different groups of people.

Therefore, with the human resource type the system can store both customer information and associate information using a single user table. For instance, data recorded for customer information is different from data recorded for associates. To enable capturing of data for both these users, both the customer and the associate can be optionally turned into an application user by providing additional details like job role and portal role.

In accordance with the present disclosure, to enable capturing of data for different users the system creates different user groups. Users having differing information are created as distinct human resources. Data when captured for a distinct human resource adheres to the structure defined for that resource. A human resource and related information will remain a data store until the resource whose information is recorded in the system is provided access rights to login to the system and operate on the data. The system leaves it optional to convert a human resource into a user.

In the event of providing access by means of conversion to an application user, the system necessitates the tagging of a job role to the user. The system allows mapping of a user to a workspace in one or more job roles to facilitate assignment of workflow rule triggered tasks to job roles in a workspace.

Data security rules for users are framed combining a user's job role and portal roles. The difference between job role and portal role can be explained with the following example, a user in a workspace can have a job role of a tester and portal role of manager. Any task related to testing will be in his work list. As a manager he can be given the privilege to view all test cases as a part of his job role. For instance, 'test case' being a resource, 'team member' being a human resource and 'user' being a portal role, the following rules can be defined on the resource 'test case' for instance, "show test cases where resource.type='team member' and
testcase.createdBy=loggedinUser.id and
loggedinUser.portalRole='user' and
loggedinUser.jobRole='tester'"

actions: view, edit, delete implies that team members in the job role 'tester' can view, edit and delete test cases created by themselves and, "show test cases where resource.type='team member' and loggedinUser.portalRole='manager' and loggedinUser.jobRole='tester' actions: view, edit, delete" implies that team members in the job role 'tester' and portal Role 'manager' can view test cases created by everyone and do the actions they are authorized to perform.

While a job role is primarily used for rule based tasks allocations, a portal role authorizes actions on the resources and their data in accordance with the present disclosure.

In accordance with this disclosure, human resource data is mapped to at least one Job role. Also, a human resource data can be converted into an application user by providing the following additional details:

1. Portal Role
2. Email Address
3. Password

The additional details of human resource type get stored in a user table which is a part of the application data repository 108. A reference to user table entry is stored in resource data table which again is a part of the application data repository 108. Job role is used in work flow definition and execution. For example, when a task is assigned to a 'Developer' role, the task will be listed to all users in that role and one of them could assign the task to his work list. An actor can play more than one portal role. Access to objects and data in a workspace is restricted by portal role.

In accordance with yet another aspect of the present disclosure, the data in database server 104 can also be imported into the application data repository 108 from external data sources including spread sheets and flat files via the importing means 110. Further, the database server 104 includes data partitioning means 112 which securely partitions data of different tenants based on their tenant identification number and group identification number.

In accordance with this disclosure, the resources further include attributes which can be classified as direct value attributes and derived attributes. The direct value attributes are the ones whose value is given by the user. Derived attributes are the ones whose value is derived based on other (derived/direct) attributes value. The attributes are further divided into two types including category attributes and formula attributes.

Category type of attributes include hierarchically arranged list of values that can be used when combo boxes are used in any resource form in accordance with this disclosure. The categories populate combo boxes in the resource forms. Any number of levels of categories can be created, for instance country, state and city can be created as three levels of categories and multiple entries can further be created under each category.

In accordance with this disclosure, when a resource attribute is defined, it can be defined of type category and any number of the levels can be chosen. When the form is rendered to the user to create an instance of this resource, a list box with the values from the chosen category is populated. So, category comes under direct value attribute because user has to select a category from a hierarchical list of predefined categories available for that attribute.

The formula types of attributes derive their values based on the value of the attribute on which they are defined. So, formula type attribute comes under derived attribute category. The functions that are supported in the formula type of attribute include math functions, text functions, logical functions, date and time functions, conditional functions and the like. The values are derived from these formulas using the procedural language postgresql database for complex calculations.

As, formula type of attributes derive their values based on the value of the attribute on which they are defined, hence, whenever the attribute value that is comprised in a formula changes, the value of the formula is dynamically recalculated. Hence, the database server 104 includes first triggering means 114 to trigger a formula recalculation action in the formula type of attribute when the attribute value changes. TABLE 1 shows the attribute dependency table used to store meta-level attribute dependency. The meta-level dependency between attributes is required to identify formula attributes that comprise an attribute. Hence, the attribute dependency table stores the type of the formula in 'Formula Attribute', the resource type that is, whether the resource is human or non-human type in the 'Formula Attribute Resource Type', the name of the attribute on which the formula is dependent in 'Attribute comprised in formula' and the 'Comprised Attribute resource' and 'relation' labels specify the dependent attributes on this formula attribute and whether the recalculated value will be of type formula for the parent resource or roll up summary for the child resource.

TABLE 1 showing the Attribute dependency table

| Formula Attribute | Formula Attribute Resource Type | Attribute comprised in formula | Comprised Attribute Resource Type | Relation (Formula/ Roll Up Summary) |
|---|---|---|---|---|

Figure 4:
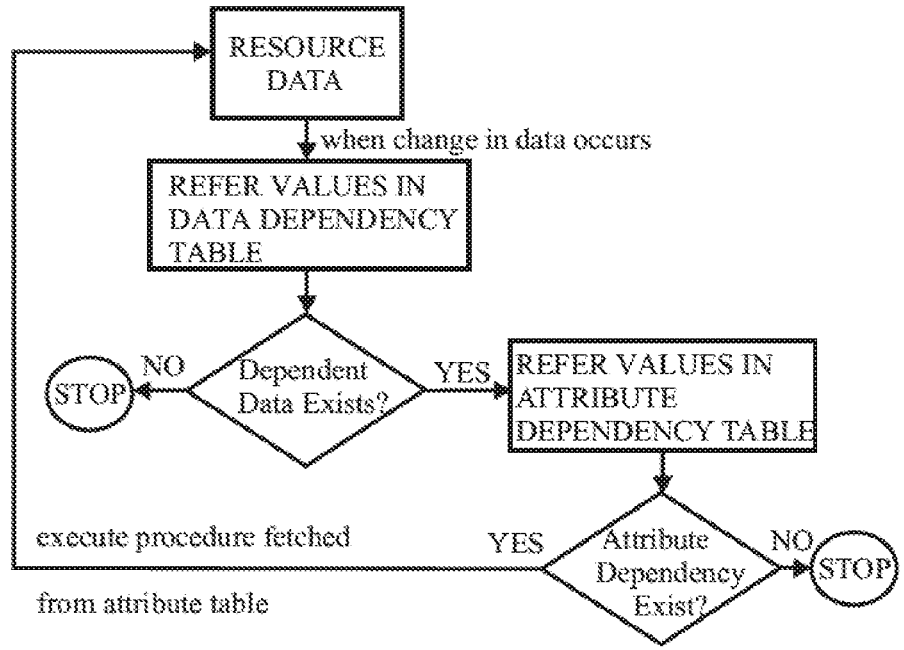
FIG. 4 is a flowchart depicting the steps in the formula evaluation process in accordance with the present disclosure.

FIG. 4 shows the steps involved in triggering a formula recalculation action in accordance with the present disclosure. The formula recalculation action of the triggering means 114 includes the steps of identifying the dependency between the data based on instances whose formula attribute value is to be recalculated when an attribute value change happens and locating those instances that are dependent on changed data by looking up the Data Dependency table as seen in TABLE 2. Then finding the formula attributes of those instances that can be affected using Attribute Dependency table seen in TABLE 1 and performing the recalculated based on the formula fetched from the attribute dependency table.

TABLE 2 showing Data Dependency Table

| Resource Instance | Dependent On (Array Of Instances) | Formula Attribute |
|---|---|---|

Resources that are related by parent-child relationships can summarize the count of child objects optionally based on a certain criteria, get the maximum or minimum or sum value of one of the attributes of the child instances. Same methodology is used to calculate Roll up summary attribute value. A procedure for each formula attribute will be created in database at the time of formula attribute definition. The same will be executed every time to recalculate the formula value. When a formula is edited by the user, the system deletes and recreates the procedure.

Data Security Unit:

The data security unit 116 interfaces all the other units of the system 100 with the database server 104. The data security unit 116 acts as a security mechanism for preventing unauthorized access to the application data in the application data repository 108. The data security unit 116 receives the portal role information from the web based browser 120 and using this information provides data restrictions at three levels for a tenant which are as follows:

Object Level
Record (Instance) Level
Attribute (Column) Level

Figure 5:
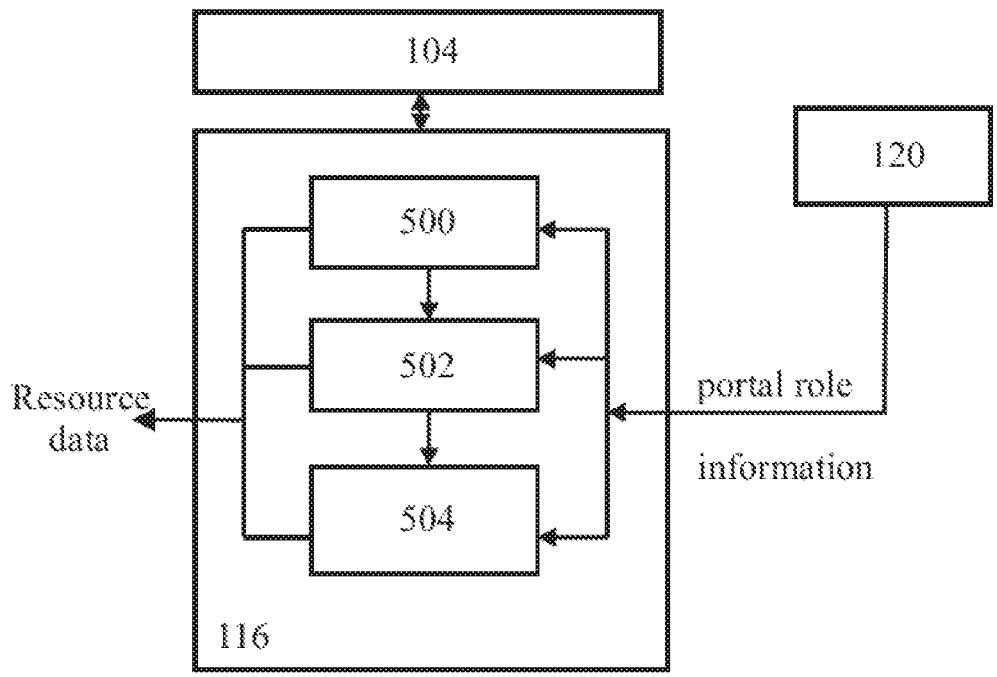
FIG. 5 is a schematic of the data security unit in accordance with the present disclosure.

FIG. 5 of the accompanying drawings shows the block diagram of the data security unit 116 and its components in accordance with this disclosure.

Object Level Security: Object level security enables users or administrators to define permissions at the object level (resource level). Thus, the object level security provides a convenient way of grouping related resources and setting add/view permissions to each of these resources to prevent the resources from being accessible. The object level security is verified by object level checking means 500 checks if a user is authorized to get access to a particular resource based on predefined resource permissions and the portal role information.

Record Level Security: Record level security enables restriction of data that is shown to a user both on the browser 120 and on reports. The record level security provides two levels of security, first level for workspace and second level for rule defined for a resource for a portal role. The record level security is verified by the record level checking means 502 which restricts display of application data on the browser 120 and the reports based on predetermined workspace associated with the user and the predefined rules for a resource for the portal role. The workspace and rules required for record level checking are explained herein below:

Workspace: The concept of workspace driven data view allows users to view data of organization groups to which they are mapped. Workspaces are synonymous with organization groups and data is filtered by these workspaces. Data created in a workspace will be mapped to that particular group. A human resource mapped to one or more workspace (groups) will be able to switch between those workspaces.

Rules: Rules are created to achieve data level security. It is optional to define rule for a resource. Rule definition comprises of actor details that is the user, objects details and conditions between them. A rule defined for a resource is executed to find the set of records that a user can see.

For instance, if, view of project milestones has to be restricted to project members then as per the record level security the following restriction will be added: "Milestones.project=User.project", here 'project' is the attribute, user is the human resource and milestones is the non-human resource. Thus, the workspace is restricted to the workspace assigned to user and the rule is "Milestones.project=User.project"

Another example will be, if an employee wants to see leave requests raised by him then the criteria will be as follows: "Record.creator=actor"

Thus, rules can be defined on each resource for each portal role. If user plays more than one portal role then union of data that satisfies the criteria will be shown to the user.

Attribute Level Security: Attribute Level security enables restriction of attribute value (cell value). The attribute can be completely hidden from a user or can be shown in read only mode. The attribute level security is verified by the attribute level checking means 504 which verifies if an attribute is restricted from being displayed for a particular portal role and accordingly denies access to that attribute data.

The typical steps involved in providing data security by the data security unit 116 include:
  showing a set of resources based on the portal role of a user logged in to the system;
  sensing if the user has selected any one of the resource to see its data;
  filtering the data by current workspace;
  filtering the filtered data by the rule defined for the resource if any; and
  applying attribute filtering to the final set of records.

Thus, the three levels of security measures ensure that tenant specific data is secure and not shared with any other tenant. Also, no unauthorized user can access the application data.

Plurality of Units for Performing Data Configuration, Tracking and Reporting Functionalities The plurality of units 118 which co-operate with the data security unit 116 to access the data in the database server 104 are as follows:

Search Unit:

The search unit includes a search engine (not shown in the figures) which dynamically creates indexes for human resources and further provides faceted search results for human resource and non-human resources.

The search engine includes index management means (not shown in the figures) for checking if a newly created data is searchable and dynamically creating an index item for that data. Typically, the indexed attributes are dynamically created using the name of the attribute. Further, re-indexing and/or deletion of the index are performed automatically in the event that the resource is updated or deleted. The index management means also creates an index of the attributes that are configured to be searchable on a specified interval.

These indexes are used by the searching means (not shown in the figures) to accept a search criteria from a user and further adapted to retrieve data corresponding to the search criteria from the database server 104. The search is available on both human and non-human resources. The search can be drilled down on any of the attributes that are chosen at the time of configuration (aka faceting).

The search engine also includes search display means (not shown in the figures) co-operating with the data security unit 116 to display retrieved data on the browser 120 based on the portal role information of the user logged into the system.

Workflow Unit

A workflow unit (not shown in the figures) co-operating with the database server 104 having a rules repository (not shown in the figures) to store time-based workflow rules and corresponding actions for each of the resources. The workflow unit also includes means to add actions for a particular resource and trigger the actions at a predetermined time based on the work-flow rules. The workflow rules are certain criteria that a user can define on a resource.

The workflow unit includes action creation means (not shown in the figures) to enable users to add a particular time-based action to a resource based on workflow rules. The time-based actions can be triggered at a predetermined time by the second triggering means. These triggered actions get recorded in an action detail repository (not shown in the figures) by the second triggering means (not shown in the figures).

The actions that are allowed are emails and automated updates to attributes of related resources. Actions can be of type email, task or attribute updates. In accordance with this disclosure, notification tables are maintained which record the email recipients and time intervals for actions of type email and task reminders. Additionally, email templates can be constructed using the workflow unit to record mail subject and mail body using run time values of the associated resource instance.

Configuration Unit

The system includes a configuration unit (not shown in the figures) to create at least one personalized workspace for a user based on user's portal role in an enterprise and further enables configuration of personalized resource forms and graphical interfaces based on the metadata. The configuration unit enables auto generation of resource forms with auto validation rules specifically in cases where manual entry of data is needed for a resource form.

Reporting Unit

A reporting unit (not shown in the figures) co-operates with the database server 104 and includes means for creation of customized drill down able reports and dashboards using data from the database server 104 and as well as from external data sources.

The reporting unit enables creation of custom reports, charts and placing them on a dashboard. These reports/charts can be run on data fetched from resource/catalog or on any external RDBMS (Relational Database Management System) data. Catalog data is the data representing resource instances that are stored in a data table which is defined to have 1 . . . n columns of data.

Further, the reporting unit enables reporting on objects and catalogue. This feature allows selecting a resource on which the report is to be run. The selected resource then performs a look up on other resources or other resources can have look ups to the selected resource. The reporting unit allows selecting all the resources that can be joined with a particular resource. For instance, if an employee looks up on an organization and a watch looks up on an employee and if a user needs to produce a report with details like employee name, the company he works for, the watches he owns and the company that manufactures the watch. Then as per the reporting unit, the user will first select the employee resource, then the resources that employee looks up on which is organization and further the resources that has a look up on employee which is watches. The watch resource looks up on manufacturer. Once the resources are selected the reporting unit enables retrieval of the attribute details along with information such as, the join condition that influenced the selection of a particular resource/attribute.

From the above example the following details can be retrieved along with the attributes of the resource as seen in TABLE 3:

TABLE 3 showing the attribute details along with the join types.

| Attribute name | Attribute of resource | Attribute Type | Join type | Joined with resource |
|---|---|---|---|---|
| Employee name | Employee | String | — | — |
| Contractor/Permanent | Employee | String | — | — |
| Organization name | Organization | String | Looked up by | Employee |
| Organization type | Organization | String | Looked up by | Employee |
| Watch name | Watch | String | Looks up on | Employee |
| Manufacturer | Manufacture name | String | Looked up by | Watch |

The attributes that are obtained can be selected as displayable columns in the report/as filters. Complex filter logic (with multiple 'AND'/'OR' operations) are also supported by the reporting unit. Additionally, the reports can also be filtered using run-time parameters. If a parameter is made run-time a parameter query is formed to obtain a list of values at run time for the group the current user is logged into. For instance, if organization type is made as a run time parameter a query will be formed as follows: "select distinct column0 from resource_data where groupName=${group-id-in-user-logged-in-session} and resource_type=Organization" where, column0 is the column name in the resource data table where the attribute data is stored and group-id-in-user-logged-in-session obtains the current group the user is logged into when the report is run to enable data security even at the parameter level.

The typical steps involved in creation of reports by the reporting unit are as follows:
  creating a query to retrieve all the instances and attributes of selected resources by automatically creating a left outer join the different resources for the current group a user is logged into;
  retrieving all attributes that are needed for a particular resource instance;
  creating a procedure that runs the query and updates a snapshot table, handling type conversions and formulas which are dynamically added in the procedure;
  running a flat query on the snapshot at run time until the data expires. Once the data is expired retrieving the data again from a predetermined data table and storing the results in the snapshot again;
  running filters on reports on the snapshot table, if the current workspace/organization group is ALL, the report retrieves data for all accessible workspaces by the user. If it is a chart, a grouped chart is displayed.

The reporting unit enables reports/charts to be drilled down to multiple reports/charts by passing value of a cell/plot or by keying in a default value or by mapping parameters between the main report and drilled down report. These drilled reports are rendered as a new tab in the browser 120.

The reporting unit also enables creation of dashboards. These dashboards take in a default parameter value for which the report /chart is to be rendered. The default value is taken for each organization group that the dashboard is given access to. In ALL view the dashboard renders report/chart taking in all keyed in default values as parameters. The reporting unit also enables configuration of dashboard refresh time to enable updating of data displayed in the dashboard. Also, report/chart parameters can be chosen as dashboard parameters.

Browser:

The browser 120 is a web based browser co-operates with the database server 104, the data security unit 116 and the plurality of units 118 to authenticate users and derive their portal role information. The browser further displays a personalized workspace for authenticated users based on the tenant or enterprise they have been mapped to. The browser acts as the interface between remote users and the system and provides the authenticated users secure access to the plurality of units based on their portal role.

Figure 6:
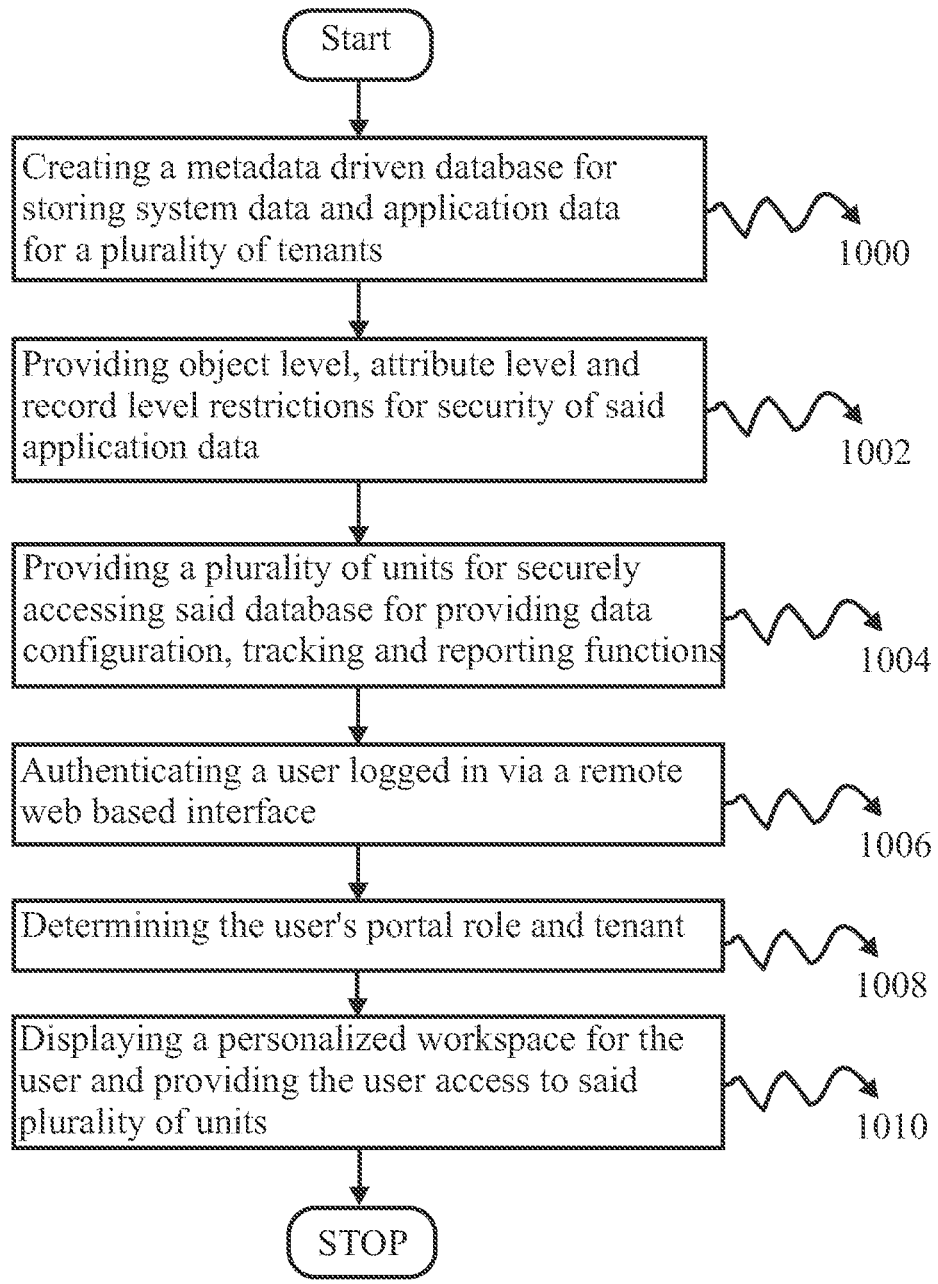
FIG. 6 is a flowchart showing the steps for providing multitenant data configuration, tracking and reporting in accordance with the present disclosure.

In accordance with this disclosure, there is envisaged a method for providing multitenant data configuration, tracking and reporting. FIG. 6 shows the steps involved in the method:
- creating a metadata driven database for hosting system data and application data for a plurality of tenants, wherein the application data of discrete tenants is partitioned based on a unique identification number assigned to the tenants, 1000;
- providing object level, attribute level and record level restrictions for security of the application data, 1002;
- providing a plurality of units for securely accessing the database for providing data configuration, tracking and reporting functionalities, 1004;
- authenticating a user logged in via a remote web based interface, 1006;
- determining the user's portal role and tenant, 1008; and
- displaying a personalized workspace for the user and providing the user access to the plurality of units, 1010.

Typically, in accordance with the present disclosure, the step of providing object level security includes the steps of:
- determining permissions assigned to resources; and
- checking if a user is authorized to get access to a particular resource based on the resource permissions and the portal role of the user.

Typically, in accordance with the present disclosure, the step of providing record level security includes the following steps:
- determining the workspace and corresponding tenant of a user;
- determining rules if any defined for a particular resource; and
- verifying if the data can be displayed for a particular user based on predetermined workspace and the predefined rules for a resource for the portal role of the user.

Typically, in accordance with the present disclosure, the step of providing attribute level security includes the steps of verifying if an attribute is restricted from being displayed for a particular portal role and denying access to that attribute data.

Typically, in accordance with the present disclosure, the step of providing a plurality of units includes the steps of providing a search engine for dynamically creating indexes for resources and providing faceted search results for the resources.

Typically, in accordance with the present disclosure, the step of providing a plurality of units includes the steps of providing a workflow unit for adding time-based actions for a particular resource, triggering the action at the predetermined time, recording the actions in a repository.

Typically, in accordance with the present disclosure, the step of providing a plurality of units includes the steps of providing a reporting unit for creating custom reports, charts and dashboards for a user for selected resources including the steps of:
- creating a query to retrieve all the instances and attributes of selected resources;
- creating a procedure to run the query and update a snapshot table;
- running a flat query on the snapshot table at run time;
- running filters on the snapshot table based on the portal role information of the user; and
- displaying the data to the user as custom reports and/or charts.

Technical Advantages

The technical advantages of the present disclosure include in providing a computer implemented system for facilitating configuration, data tracking and reporting for data centric applications in which the system enables efficient and prompt porting of paper based/spreadsheet based tracking systems to web based applications.

The system provides a generic framework which can be used for porting any business or enterprise to a web based application. Additionally, the system provides faster creation of a framework for deploying a business solution by using metadata and static resources.

Further, the system provides self-help provisions which enable users to create their own table definitions, customized user interfaces and customized reports. Thus, reducing the time and cost involved in implementing a solution from scratch. The time and human intervention involved in creation of customized user interface is further minimized by providing categories which enable auto population of combo boxes used in the user interface.

In addition, the system enables quick searches by auto creation and management of indexes for human type of resources. The system provides faceted or conceptual search with drill down capability with restriction to details based on user's portal role.

Still further, the system provides security of data by implementing security measures at three levels namely record level, object level and attitude levels. The secured data is viewed by users by means of workspaces within a tenant.

Furthermore, the system includes reporting and dashboard capability using data from within the system as well as from external databases.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results.

Any discussion of documents, acts, materials, devices, articles or the like that has been included in this specification is solely for the purpose of providing a context for the invention. It is not to be taken as an admission that any or all of these matters form part of the prior art base or were common general knowledge in the field relevant to the invention as it existed anywhere before the priority date of this application.

While considerable emphasis has been placed herein on the particular features of this invention, it will be appreciated that various modifications can be made, and that many changes can be made in the preferred embodiment without departing from the principles of the invention. These and other modifications in the nature of the invention or the preferred embodiments will be apparent to those skilled in the art from the disclosure herein, whereby it is to be distinctly understood that the foregoing descriptive matter is to be interpreted merely as illustrative of the invention and not as a limitation

The invention claimed is:

1. A computer implemented system for facilitating configuration, data tracking and reporting for data centric applications, comprising:
   a metadata driven database server comprising application data repository and system data repository, wherein said system data repository is adapted to host metadata, said application data repository is adapted to host application data for a plurality of tenants, said application data is divided into resources and said resources are further divided into attributes;
   a data security unit processor co-operating with said database server adapted to provide object level, attribute level and record level security for said application data;
   a plurality of processors co-operating with said data security unit processor to access said database server and adapted to provide data configuration, tracking and reporting functionalities; and
   a web based browser co-operating with said database server, said data security unit processor and said plurality of processors adapted to authenticate users and derive their portal role information and further adapted to display personalized workspace for authenticated users and still further adapted to provide authenticated users secure access to said plurality of processors based on said portal role;
wherein said database server further includes:
   importing means adapted to import external application data from multiple data sources including spread sheets and flat files;
   data partitioning means adapted to securely partition data of different tenants based on their tenant identification number and group identification number; and
   first triggering means adapted to trigger a formula recalculation action in the event that value of a formula based attribute changes.

2. The system as claimed in claim 1, wherein said resources are selected from the group of resources consisting of human resources, non-human resources, static resources and non-static resources.

3. The system as claimed in claim 1, wherein said attributes are selected from the group of attributes consisting of derived attributes, direct value attributes.

4. The system as claimed in claim 1, wherein said data security unit processor is further adapted to receive portal role information for a user from said browser, said data security unit processor further includes:
   object level checking means adapted to check if a user is authorized to get access to a particular resource based on predefined resource permissions and said portal role information;
   record level checking means adapted to restrict display of application data based on predetermined workspace associated with a user and predefined rules for a resource for said portal role; and
   attribute level checking means adapted to restrict display of an attribute value for a user based on said portal role.

5. The system as claimed in claim 1, wherein said system includes registration means adapted to register an enterprise and its member companies with the system and further adapted to assign unique tenant identification number and group identification number to each of the enterprises and its member companies in the event that the registration is successful.

6. A computer implemented system for facilitating configuration, data tracking and reporting for data centric applications, said system comprising:
   a metadata driven database server computer comprising an application data repository and a system data repository, wherein said system data repository is adapted to host metadata, said application data repository is adapted to host application data for a plurality of tenants, said application data is divided into resources and said resources are further divided into attributes;
   a data security unit processor co-operating with said database server computer adapted to provide object level, attribute level and record level security for said application data;
   a plurality of processors co-operating with said data security unit processor to access said database server computer and adapted to provide data configuration, tracking and reporting functionalities, wherein at least some of the plurality of processors include a search engine, a workflow unit, a reporting unit and a configuration unit; and
   a web based browser, executing on a computer and co-operating with said database server computer, said data security unit processor and said plurality of processors adapted to authenticate users and derive their portal role information and further adapted to display personalized workspace for authenticated users and still further adapted to provide authenticated users secure access to said plurality of processors based on said portal role;
wherein:
   the search engine is adapted to dynamically create indexes for said resources and further adapted to provide faceted search results for said resources;
   the reporting unit co-operates with said database server computer having means for creation of customized drill down able reports and dashboards using data from said database server computer and external data sources;
   the workflow unit co-operates with said database server computer having a rules repository to store time-based workflow rules and corresponding actions for each of the resources, said workflow unit adapted to add actions for a particular resource and trigger said actions at a predetermined time based on said work-flow rules.

7. The system as claimed in claim 6, wherein said configuration unit is adapted to create at least one personalized workspace for a user based on user's portal role information in an enterprise, said configuration unit further adapted to enable configuration of personalized forms with validation rules for manual entry of data and graphical interfaces based on said metadata.

8. The system as claimed in claim 6, wherein the workflow unit further includes:
   action creation means adapted to enable a user to add a particular time-based action to a resource based on said workflow rules;
   second triggering means adapted to trigger an action at a predetermined time; and
   an action detail repository adapted to record the actions triggered by said second triggering means.

9. The system as claimed in claim 6, wherein said workflow unit is adapted to add actions selected from the group of actions consisting of email reminders, task reminders and attribute/resource updates to a particular resource.

10. The system as claimed in claim 6, wherein the search engine further includes:
index management means adapted to dynamically create indexes on creation of resources and further adapted to re-index and/or delete the index in the event that the resource is updated or deleted;
searching means adapted to accept a search criteria from a user and further adapted to retrieve data corresponding to said search criteria from said database server computer; and
search display means co-operating with said data security unit processor, said search display means adapted to display retrieved data on said browser based on the portal role information of the user.

11. A method for providing multitenant data configuration, tracking and reporting, said method comprising the following steps:
creating a metadata driven database for hosting system data and application data for a plurality of tenants, wherein the application data of discrete tenants is partitioned based on a unique identification number assigned to the tenants and the application data is divided into resources and resources are further divided into attributes;
providing object level, attribute level and record level restrictions for security of said application data;
providing a plurality of processors for securely accessing said database for providing data configuration, tracking and reporting functionalities;
authenticating a user logged in via a remote web based interface;
determining the user's portal role and tenant; and
displaying a personalized workspace for the user and providing the user access to said plurality of processors;
wherein the step of providing a plurality of processors includes the steps of providing a search engine for dynamically creating indexes for resources and providing faceted search results for said resources.

12. The method as claimed in claim 11, wherein the step of providing object level security includes the steps of:
determining permissions assigned to resources; and
checking if a user is authorized to get access to a particular resource based on the resource permissions and the portal role of the user.

13. The method as claimed in claim 11, wherein the step of providing record level security includes the following steps:
determining the workspace and corresponding tenant of a user;
determining rules if any defined for a particular resource; and
verifying if the data can be displayed for a particular user based on predetermined workspace and the predefined rules for a resource for the portal role of the user.

14. The method as claimed in claim 11, wherein the step of providing attribute level security includes the steps of verifying if an attribute is restricted from being displayed for a particular portal role and denying access to that attribute data.

15. The method as claimed in claim 11, wherein the step of providing a plurality of processors includes the steps of providing a workflow unit for adding time-based actions for a particular resource, triggering the action at the predetermined time, recording the actions in a repository.

16. The method as claimed in claim 11, wherein the step of providing a plurality of processors includes the steps of providing a reporting unit for creating custom reports, charts and dashboards for a user for selected resources including the steps of:
creating a query to retrieve all the instances and attributes of selected resources;
creating a procedure to run said query and update a snapshot table;
running a flat query on the snapshot table at run time;
running filters on the snapshot table based on the portal role information of the user; and
displaying the data to the user as custom reports and/or charts.

* * * * *